United States Patent [19]
Caristi et al.

[11] 3,921,097
[45] Nov. 18, 1975

[54] CROSSED-FIELD EXCITATION, PULSED GAS LASER

[75] Inventors: Robert F. Caristi; Donald A. Leonard, both of Stoneham; Irving Itzkan, Boston, all of Mass.

[73] Assignee: Avco Everett Research Laboratory, Inc., Everett, Mass.

[22] Filed: May 30, 1974

[21] Appl. No.: 474,780

[52] U.S. Cl........ 331/94.5 G; 313/217; 331/94.5 PE
[51] Int. Cl.²...................... H01S 3/03; H01S 3/097
[58] Field of Search..... 331/94.5 C, 94.5 D, 94.5 G, 331/94.5 PE; 250/426; 313/217

[56]    References Cited
         UNITED STATES PATENTS
3,553,603   1/1971   Leonard....................... 331/94.5 G
3,609,570   9/1971   Gould........................... 331/94.5 G
3,662,284   5/1972   Beaulieu et al.............. 331/94.5 PE OTHER PUBLICATIONS
Lamberton et al., "Improved Excitation Techniques for Atmospheric Pressure $CO_2$ Lasers," Electronics Letters, 7, 3–1971, pp. 141–142.

*Primary Examiner*—Alfred E. Smith
*Assistant Examiner*—Wm. H. Punter
*Attorney, Agent, or Firm*—Charles M. Hogan, Esq.; Melvin E. Frederick, Esq.

[57]    ABSTRACT

A crossed-field excitation, pulsed gas laser is described having improved geometry such that operating high repetition rates are achievable in combination with high peak output power without the necessity of very high gas flow rates. Opposed generally U-shaped electrodes supplied with electrical pumping power in the conventional manner in combination with and separated by electrically insulating side wall members define an elongated lasing region generally rectangular in cross section and this geometry results in optimum cooling of the gaseous lasing medium and optimum electric field characteristics during operation thereby permitting increased pumping rates at increased output power levels as compared to typical transversely excited prior art devices.

7 Claims, 5 Drawing Figures

CROSSED-FIELD EXCITATION, PULSED GAS LASER

This invention relates to transversely electrically excited pulsed gaseous lasers and more particularly to such lasers having an electrode configuration that both forms part of the laser channel and provides improved operating characteristics.

In the operation of, for example, prior art pulsed nitrogen and pulsed neon lasers, inductances in the discharge circuit have led to limitation of the discharge current, and failure of high-voltage components such as cables forming a part of the discharge circuit has been a common occurrence. Further, in the aforementioned prior art lasers, the discharge current is limited to a value materially less than that which would result if it were limited only by the discharge resistance of the laser cavity and the maximum voltage that can be applied.

A crossed-field geometry which has been developed for pulsed nitrogen and pulsed neon lasers is described in U.S. Pat. No. 3,553,603 issued Jan. 5, 1971 and U.S. Pat. No. 3,633,127 issued Jan. 4, 1972 to which reference is made, the specifications of which are incorporated herein as if set out at length. Improved electrode means for such lasers are described in U.S. Pat. No. 3,636,472 issued Jan. 18, 1972 to which reference is also made, the specification of which is incorporated herein as if set out at length.

In the aforementioned prior art crossed-field type of laser described in U.S. Pat. No. 3,553,603, electrical power flows from a capacitor (charged by a conventional high-voltage source) through a plurality of low inductance transmission cables to an effectively planar upper electrode which extends the length of the active region or cavity. A single U-shaped channel member serves both as structural support for the device and as the other electrode. The discharge takes place along planar dielectric side walls disposed within the U-shaped channel. On the short time scale during which these lasers operate, the current distribution in the active region is essentially inductance controlled and when the laser is operating normally, essentially uniform discharges can be produced along the entire length of the channel.

However, because the current distribution is essentially inductance controlled, it is necessary that where high-voltage transmission cables are used, they have as low an inductance as possible to attain maximum efficiency. This necessitates the use of cables having thin dielectrics which contributes to cable failure and which problem is more pronounced at high pulse repetition rates. Clearly, as the pulse repetition rate is increased, the possibility of cable failure increases at least proportionately. The presence of high-voltage transmission cables also results in a high exposure to the high voltage used (typically 20 KV) and a rather large amount of spurious electromagnetic radiation since each of the cables tends to function as an antenna.

In the aforementioned prior art crossed-field type of laser disclosed in the aforementioned U.S. Pat. No. 3,633,127 which comprises an improvement over the laser disclosed in the aforementioned U.S. Pat. No. 3,553,603, an improved laser is disclosed wherein transmission cables are not required. In this device, a high-voltage driving electrical field is periodically applied in a crossed-field geometry across the enclosed region by a capacitor discharge circuit comprising switching means, a main energy storage capacitor and a plurality of secondary capacitors carried by the means defining the laser enclosed region, the secondary capacitors being connected across the enclosed region.

The present invention comprises a new and improved configuration over prior art crossed-field pulsed gas lasers including those referred to hereinabove, which configuration overcomes significant disadvantages inherent in the prior art designs while maintaining the desirable attributes of these designs. Broadly, the new configuration in accordance with the present invention allows the generation at any gas flow rate of high-peak laser output power and operation at high pulse repetition rates simultaneously and with a single device.

Previous pulsed gas lasers utilizing crossed-field excitation techniques such as those used in pulsed nitrogen and pulsed neon lasers are broadly divisible into two classes: (1) those producing moderate peak laser output power at relatively high pulse repetition rates, such as, for example, those described in the aforementioned U.S. Pat. Nos. 3,553,603 and 3,633,127 (Class I lasers); and (2) those producing relatively high peak laser output power at relatively low pulse repetition rates, such as, for example, lasers of the type described in the article entitled "A Reliable, Repetitively Pulsed, High-Power Nitrogen Laser" by B. W. Woodward, V. J. Ehlers, and W. C. Lineberger, published in *Review of Scientific Instruments*, Vol. 44, No. 7, pp. 882, 887, July, 1973 (Class II lasers) to which reference is made and which is incorporated herein as if set out at length.

Because of the low inductance of the channel design of Class I lasers and the low inductance of the driving circuits used therewith, and possibly due also to electrical skin effects or other field effects in the conducting gas, the discharge in the active region takes place along each dielectric side wall thereby producing a dual output beam. This beam geometry occurs not only with "wire brush" type electrodes disclosed in U.S. Pat. No. 3,636,472, but also with a simple flat electrode or an electrode having but a single row of projections.

When the thyratron or other switch of the Class I type laser is triggered, the energy stored in the main storage capacitor begins to transfer to, for example, secondary capacitors. When the voltage across the secondary capacitors becomes sufficiently high to break down the gas within the laser channel or active region, the secondary capacitors then discharge into the gaseous lasing medium, such as, for example, nitrogen at a rate faster than that which the switch and the various circuit inductances would otherwise allow, the inductance around the secondary capacitor-channel loop being very low. In crossed-field channels of this type, the initial electric field in the gas is very high in the region near the upper electrode (see FIG. 4) or cathode, and a cascading effect occurs such that the entire channel breaks down rapidly between the electrodes and uniformly along their length. Thus, the high initial field limits the maximum voltage obtained by the secondary capacitors which, in turn, limits the peak current into the discharge channel and, thus the peak laser output power.

The relative closeness of the side walls in Class I type lasers and perhaps, more importantly, the proximity of the discharge current to the channel side walls means that cooling of the gas by diffusion of heat to the channel side walls is greatly promoted as opposed to a case where the discharge is far removed from the side walls as in Class II lasers. Lasers of the Class I type can be operated at high pulse repetition rates. Peak laser output powers of hundreds of kilowatts from nitrogen and pulse repetition rates of 500 Hz and more are routinely achieved simultaneously in commercial lasers of this type with diffusion being the principal cooling mechanism.

The construction and operation of Class II types of crossed-field lasers are similar to Class I lasers except that the channel is generally cylindrical in shape, and, hence, as distinguished from Class I lasers, the discharge is relatively far removed from the channel side walls and the initial electric field is more or less uniformly applied across the inter-electrode spacing or diameter of the channel. This type of channel design tends to inhibit gas breakdown so that the discharge circuit capacitance or secondary capacitors coupled across the channel can charge to a relatively high voltage before gas breakdown occurs. Accordingly, Class II lasers thus produce a relatively high peak laser output power (typically 1 MW) higher than that of Class I lasers in spite of their relatively inductive discharge geometry.

While Class II type lasers have desirable peak laser output power characteristics, they suffer from severe pulse rate sensitivity. Unless high-speed convective gas flow is used, cooling of the gaseous lasing medium must be accomplished by diffusion to the side walls and the relatively large distance between the discharge and the side walls inhibits this process. When operating with nitrogen, Class II lasers typically exhibit a decrease in peak laser output power of as much as a factor of 4 over a pulse rate range from about 5 to 50 Hertz.

Lasers in accordance with the present invention combine the desirable features of each class of laser described above without being subjected to their respective limitations. In accordance with the present invention, the discharge is close to the side walls as with Class I lasers so the diffusion time is short and the achievable pulse repetition rate is high. However, the volume of gaseous lasing medium in the vicinity of each electrode is in a region of relatively low initial electric field with equipotential lines being essentially perpendicular to the direction of the discharge. Secondary capacitors or their equivalent can thus be charged to a high voltage before the gaseous lasing medium breaks down as in Class II lasers. Thus, in accordance with the present invention, a low inductance channel geometry is provided and the discharge circuit may utilize secondary capacitors of low-inductance, parallel-plate construction with the termination inductance being principally dependent on the dielectric thickness of the side walls required for adequate insulation and structural integrity. Lasers in accordance with the present invention provide in combination those features necessary for the generation of high peak laser output power at a high pulse repetition rate since they permit the development of high voltages across the secondary capacitors in combination with a channel geometry which provides for optimum cooling to remove waste heat without necessarily resorting to high speed convective gas flow. Thus, very high average laser output power is achievable. Accordingly, it is a general object of the present invention to overcome the aforementioned objectionable features found in prior art gaseous lasers while retaining their desirable features.

A further object of the present invention is to provide a gas laser for producing light at high output power levels which employs an improved discharge circuit to provide a pulsed electric field in the gaseous lasing medium.

Another object of the invention is to provide a gas laser for producing light at high output power levels which employs an improved channel construction in combination with a circuit to provide a pulsed electric field in the gaseous lasing medium.

Yet another object of the invention is to provide a gas laser having a pulsed electric field wherein the driving pulse current duration is minimized and the peak pulse current in the laser gas is increased to increase the efficiency of the laser.

A further object of the present invention is to provide efficient excitation for pulsed gas lasers having very short upper state lifetimes.

A still further object of the present invention is to provide for pulsed gas lasers having very short upper state lifetimes, a discharge circuit that provides an optimum combination of energy, voltage and risetime for maximum laser efficiency.

A still further object of the present invention is to provide a crossed-field laser device having a higher pulse repetition rate and higher laser output power than comparable prior art crossed-field lasers.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

Figure 1:
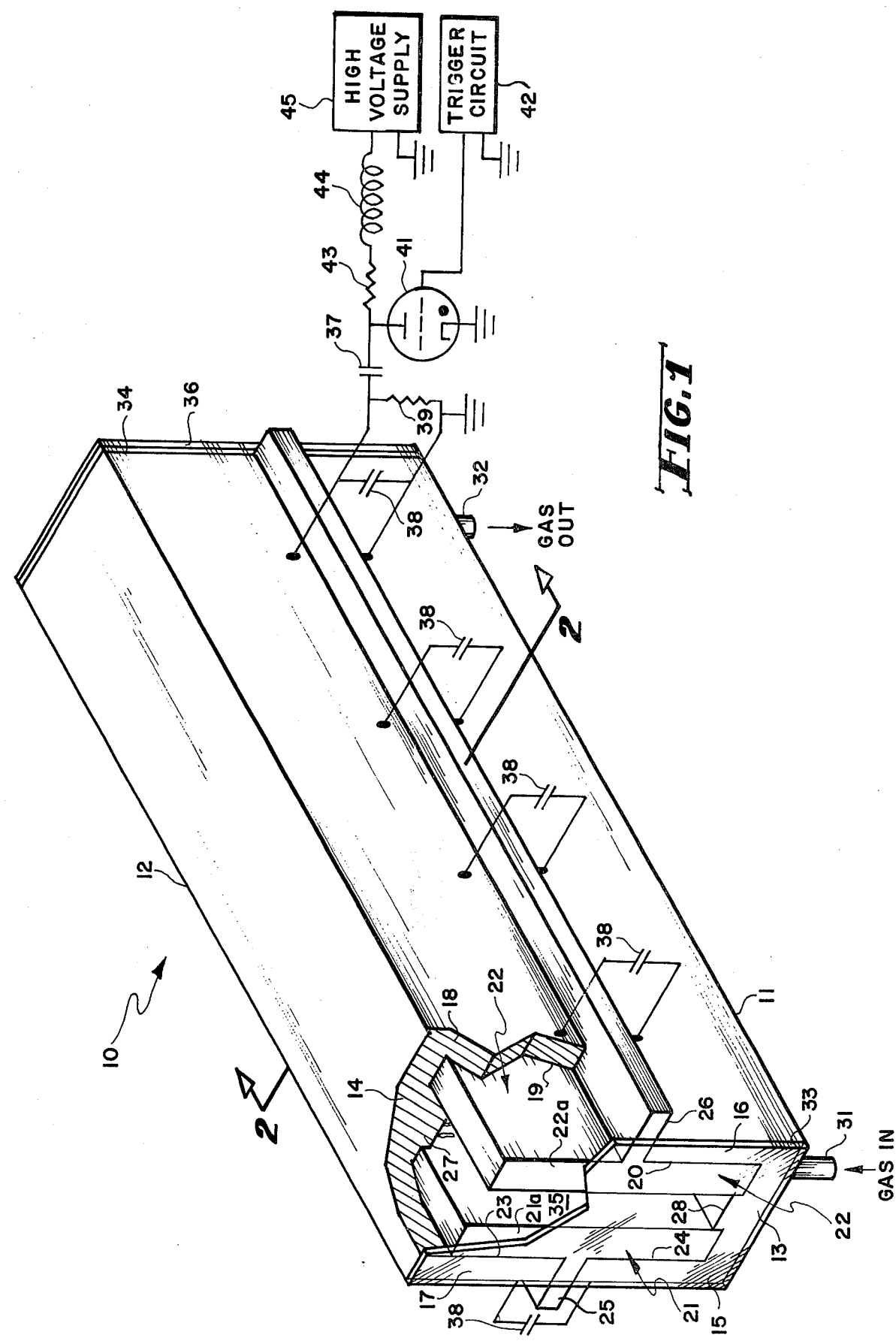
FIG. 1 is a partly schematic perspective view with parts broken away of a laser in accordance with the invention.
Figure 2:
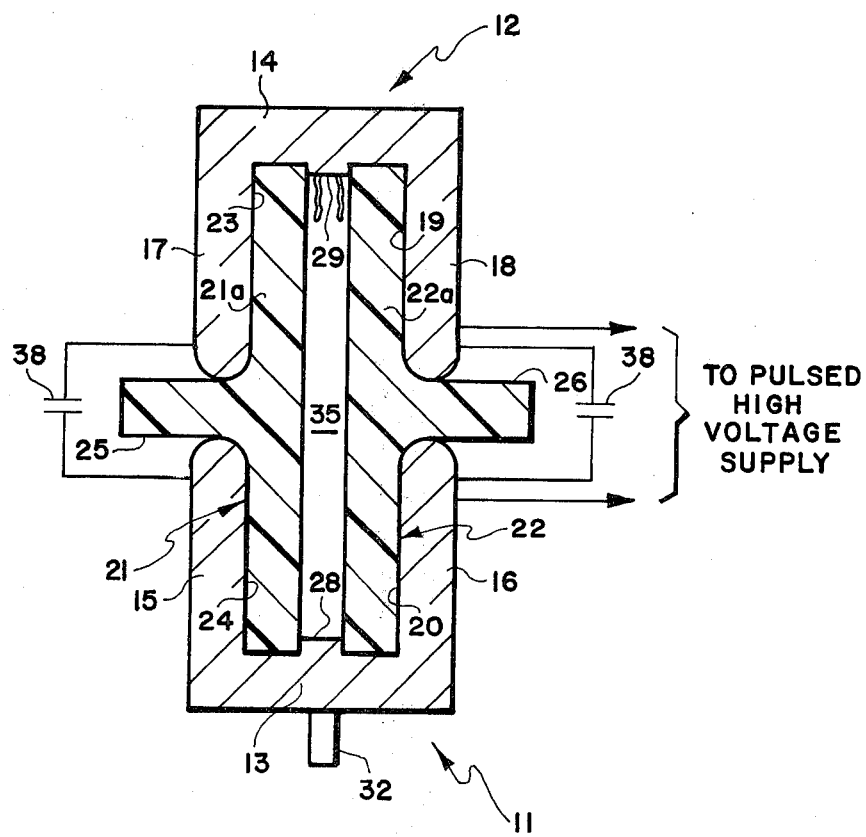
FIG. 2 is a sectional view taken on line 2—2 of FIG. 1.

Referring now to the drawings, there is shown a laser generally designated by the numeral 10 which may be attached to and enclosed within a protective and/or ornamental enclosure (not shown).

The laser channel as shown is comprised of two oppositely disposed generally U-shaped electrode members 11 and 12 fabricated from any suitable electrically conductive conducting material, such as aluminum. Each electrode member 11 and 12 has a bight or base portion 13 and 14 interconnecting two preferably flat side or leg portions 15–16 and 17–18 that extend outwardly normal to their respective base portions. The extreme ends of the leg portions of each electrode member define an elongated open end. The opened ends of the electrode members are oppositely disposed and adjacent each other.

Within the electrode members there is provided a pair of oppositely disposed electrically nonconductive insulating members 21 and 22 fabricated of suitable high-voltage insulating material such as Pyrex glass, alumina or beryllia. First or side wall portions 21a and 22a of the insulating members are disposed over and cover the inner preferably parallel surfaces 19–20 and 23–24 of the electrode member leg portions such that only the middle inner surface of the base portions are exposed. The insulating members 21 and 22 are each further provided with a second portion 25 and 26 disposed between the extreme ends of the leg portions and having a configuration such that arcing is prevented external to the lasing gas. For the embodiment shown, the side wall portion and second portion of each insulating member defines a generally T-shaped cross section. Other well-known insulating configurations may be used.

A plurality of spacers or stepped portions 27 and 28 forming part of each base portions are provided to maintain the electrically nonconductive side wall portions in abutting engagement with the leg portions of the electrode members and in spaced relationship. The space thus provided between the electrically nonconductive side walls defines a relatively thin elongated duct having a generally rectangular cross section and extending from adjacent one end of the laser device 10 to the opposite end thereof.

A pair of gas feeder tubes 31 and 32 are provided in the base portion of electrode member 11 and provide gas inlet and outlet passages to permit a gaseous lasing medium such as, for example, nitrogen or neon to be flowed through the duct.

A pair of windows 33 and 34 transparent to the laser radiation are disposed adjacent each end of the laser and serve to seal the ends of the duct and form an enclosed region 35 which contains the lasable gas. The windows 33 and 34 may be fabricated from any material having the desired properties as stated above.

It should be noted here that the enclosed region 35 is generally maintained at a pressure less than atmospheric during operation. As is obvious, therefore, it is necessary to pressure seal the means defining the enclosed region 35. The various contacting surfaces between the side walls 21a and 22a and the electrode members 11 and 12 and the windows 33 and 34 are therefore sealed by a suitable sealant material to provide at least a relatively gas-tight enclosure in the enclosed region 35. Adjacent the transparent window 34, there is preferably provided an adjustably disposed mirror 36. The mirror 36 may be a first surface aluminized mirror and may be adjustably supported in convention manner (not shown) to establish perpendicularity with the longitudinal axis of the enclosed region which corresponds with the longitudinal axis of the device.

The electrode member 12 which may conveniently be a cathode is electrically connected to an energy storage capacitor 37, a plurality of secondary capacitors 38 and a resistor 39 in the following manner. Disposed adjacent the extreme ends of the leg portions of the electrode members are a plurality of secondary capacitors 38. The secondary capacitors 38 may be of the low-inductance, parallel plate conventional type. The secondary capacitors may be arranged as shown in oppositely disposed pairs along the length of the enclosed region. Resistor 39 is connected in parallel with the secondary capacitors 38 and completes the charging path for capacitor 37. The secondary capacitors must be of sufficient size to store enough energy to create an inversion in the gaseous lasing medium such as, for example, nitrogen and neon within the enclosed region 35 when the switching means such as, for example, thyratron 41 is fired by a trigger circuit 42 which controls the laser repetition rate. The storage capacitor 37 may be a commercially available mica dielectric capacitor or capacitors of sufficient size to store the high-voltage charge required to charge the secondary capacitors 38. The energy storage capacitor 37 is charged from a charging network circuit comprising resistor 43 and inductor 44. The charging network is coupled to a high-voltage supply 45. The charging network functions to allow the laser device to be operated at a low repetition rate of a single pulse or repetitively up to rates of 500 pulses per second or more. The value of resistor 43 and inductor 44 are chosen to be consistant with the fastest repetition rate at which the circuit is intended to operate. Resistor 43 and inductor 44 also act as an isolation element between the high-voltage source 45 and the balance of the circuit.

Figure 3:
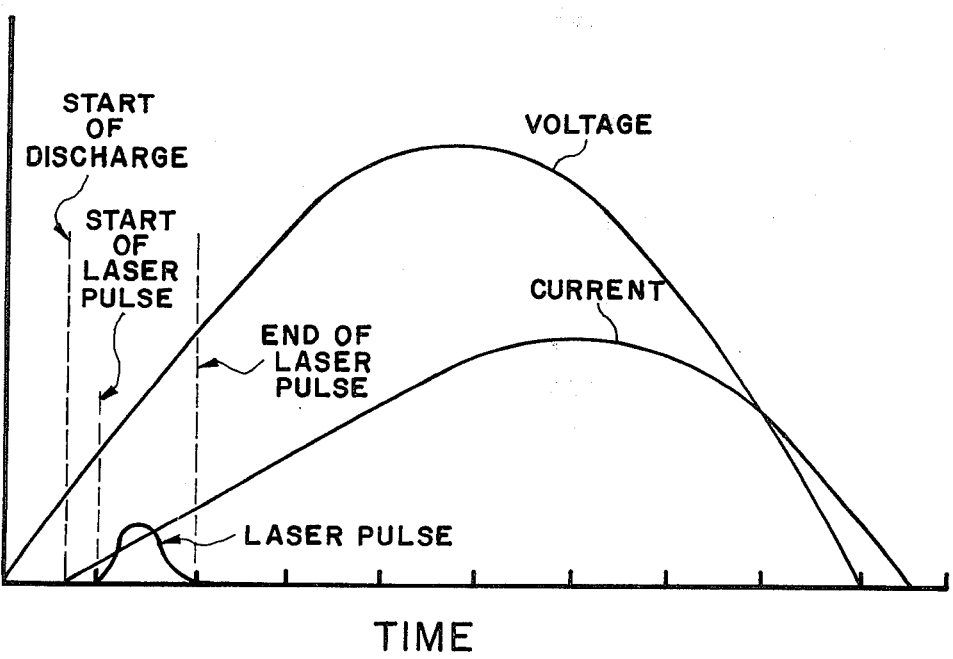
FIG. 3 is a graphic illustration of the typical variation of voltage, current, and laser power with time for a typical nitrogen laser.

When, for example, gas lasers of the type here concerned are operated with nitrogen in the ultraviolet at 3,371A, then the sequence of events is sensibly as illustrated in FIG. 3. Thus, as may be seen from an inspection of FIG. 3, when a high-voltage pulse represented by the voltage curve is applied across the electrodes at time zero, a short time thereafter, the discharge starts as current begins to flow and the gas begins to lase as represented by respectively the current and laser pulse curves. A short time after the start of the discharge, which is to say after the beginning of the laser pulse, before either the discharge voltage or current reaches its peak value, the lasing stops, because of the self-terminating pulse characteristic of nitrogen lasers due to the rapidity with which the lower laser level of the nitrogen fills up. The amount of energy in the laser pulse is a function of the electrical energy deposited in the gas during the time in which lasing occurs and which, at best, is considerably less than optimal. The upper limit to this energy is effectively established by the breakdown voltage of the gas and, hence, if the start of discharge current flow is delayed, the breakdown voltage can be increased and the laser output power will be increased.

Figure 4:
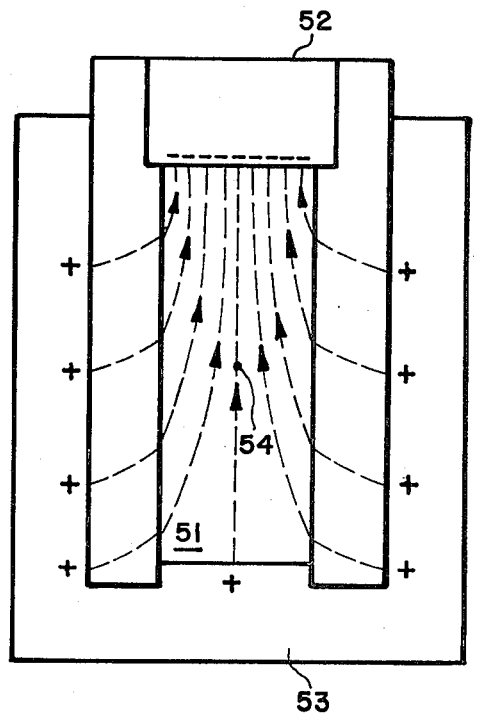
FIG. 4 illustrates electric field characteristics of similar prior art lasers.
Figure 5:
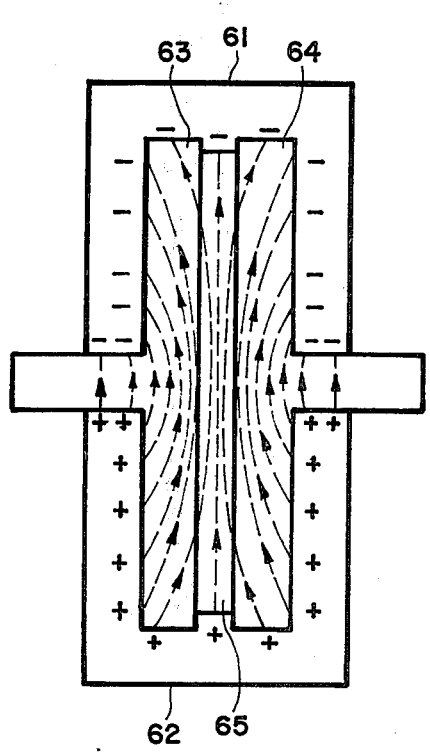
FIG. 5 illustrates the improved electric field characteristic of lasers constructed in accordance with the present invention.

In conventional pulsed gas nitrogen lasers of the type shown and described in the aforementioned U.S. Pat. Nos. 3,553,603 and 3,633,127, and typically having a channel construction as shown in FIG. 4, the electric field in the laser enclosed region 51 tends to be nonuniform along its length with the most intense field being located near the cathode-electrode 52. When the electric field in the region near the cathode-electrode 52 is sufficient to cause breakdown of the lasing medium near the cathode, the gas begins to break down in this region. This breakdown region expands from the cathode-electrode 52 to the oppositely disposed anode-electrode 53 and current begins to flow through the enclosed region transverse to the longitudinal axis 54 of the enclosed region. If this electric field is made more uniform along its length, then in effect the standoff voltage of the lasing medium will be increased and the start of the discharge will be delayed until the discharge voltage reaches a higher level. FIG. 5 shows how this is accomplished in accordance with the present invention.

As shown in FIG. 5, when the discharge voltage is applied to the electrodes 61 and 62, a field is established between the electrodes which is substantially uniform in the enclosed region 65. This results in an electric field in the enclosed region that is substantially more uniform than the electric field in lasers of the type illustrated in FIG. 4. In fact, visual observations indicate that the breakdown of the lasing medium occurs first in the center portion of the enclosed region or at some random point therein rather than close to one of the electrodes.

The new and unobvious advantages of the present invention are illustrated by an experiment conducted with a standard production Model C-400 pulsed nitrogen laser manufactured by the Avco Everett Research Laboratory, Inc. using a crossed-field channel design of the type and as taught in the aforementioned U.S. Pat. No. 3,633,127. An aforementioned Model C-400 laser was modified to provide a channel construction substantially as shown and described herein with no other changes of substance being made. This modified C-400 laser was operated under standard operating conditions so that a comparison could be made between its output and the output of an unmodified standard production model.

At a normal maximum operating voltage of 11.5 KV and a pulse rate of 10 Hz, the modified laser produced an output of 0.426 millijoules. This output is to be compared with the usual output of 0.23 to 0.28 millijoules for standard production models under the same conditions. As may be seen from the above, the laser modified in accordance with the present invention provided an improvement in laser output by a factor of about 1.5 to 1.8. The modified laser was also operated at pulse repetition rates up to 100 Hz and when so operated, exhibited substantially the same pulse rate response as that of a standard production model.

It is to be understood that the surfaces defining the enclosed region may be varied from that shown and made curved or non-planar, for example, so long as the electric field in the enclosed region is nowhere substantially greater than that value of the electric field which would be given by the ratio of the voltage difference between the electrodes to their separation.

While reference has been made to nitrogen and neon, many other gases have been made to lase in this type of laser and are includable within the scope of the invention.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:
1. In a laser device for producing pulses of laser radiant energy and having a longitudinal axis, the combination comprising:
   a. first and second oppositely disposed generally U-shaped electrically conductive electrode means spaced one from another and extending parallel to said longitudinal axis, said electrode means each having a base portion intermediate a pair of leg portions having inner surfaces, the extreme ends of each pair of leg portions defining an open end, said open ends being oppositely disposed and adjacent each other;
   b. electrically nonconductive means insulating said electrode means one from another and covering the inner surfaces of the leg portions of each electrode means to at least in part with said base portions define an elongated duct;
   c. means closing the ends of said duct to define an enclosed region for receiving a lasable gaseous medium; and
   d. circuit means coupled to said electrode means for providing pulsed electric discharges through said lasable gaseous medium in said cavity to produce lasing action therein, said discharges being provided substantially uniformly along substantially the length of and across said cavity normal to said longitudinal axis.

2. The combination as defined in claim 1 wherein said electrode means and said electrically nonconductive means define an elongated duct having a substantial rectangular cross section.

3. The combination as defined in claim 2 wherein said rectangular cross section is defined by a height dimension defining the distance between said base portions and a width dimension substantially less than said height dimension.

4. The combination as defined in claim 2 wherein said circuit means includes capacitor means coupled to said first and second electrode means.

5. The combination as defined in claim 4 and additionally including storage capacitor means and means including switching means for sequentially charging said storage capacitor means and then coupling the charge on said storage capacitor means to said capacitor means to effect said electrical discharges through said lasable gaseous medium.

6. In a laser device for producing pulses of laser radiant energy and having a longitudinal axis, the combination comprising:
   a. first and second oppositely disposed U-shaped electrically conductive electrode means spaced one from another and extending along said longitudinal axis, each said electrode means having a flat base portion intermediate a pair of flat leg portions having inner surfaces parallel one to another and extending outwardly normal to said base portion, the extreme ends of each pair of leg portions defining an open end, said open ends being oppositely disposed and adjacent each other;
   b. first and second oppositely disposed electrically nonconductive means insulating said electrode means one from another, each said nonconducting means having a first portion covering the inner surfaces of two adjacent opposed leg portions of said electrode means to at least in part with said base portions define an elongated duct having a substantially rectangular cross section, each said nonconducting means including a second portion extending between and separating said two leg portions;
   c. means closing the ends of said duct to define an enclosed region for receiving a lasable gaseous medium; and
   d. circuit means coupled to said electrode means for providing pulsed high voltage electric discharges between said base portions and through said lasable gaseous medium in said enclosed region to produce lasing action therein, said discharges being provided substantially uniformly along substantially the length of and across said enclosed region normal to said longitudinal axis.

7. The combination as defined in claim 6 wherein said rectangular cross section is defined by a height dimension defining the distance between said base portions and a width dimention substantially less than said height dimension.

* * * * *